United States Patent
Pettazzi et al.

(10) Patent No.: US 10,224,685 B2
(45) Date of Patent: Mar. 5, 2019

(54) MULTI-BEAM LASER SYSTEM

(71) Applicant: Nederlandse Organisatie voor toegepast-natuurwetenschappelijk onderzoek TNO, s-Gravenhage (NL)

(72) Inventors: Federico Pettazzi, 's-Gravenhage (NL); Erwin John Van Zwet, 's-Gravenhage (NL); Frerik Van Beijnum, 's-Gravenhage (NL)

(73) Assignee: Nederlandse Organisatie voor toegepast-natuurwetenschappelijk onderzoek TNO, 's-Gravenhage (NL)

( * ) Notice: Subject to any disclaimer, the term of this patent is extended or adjusted under 35 U.S.C. 154(b) by 0 days.

(21) Appl. No.: 15/563,095

(22) PCT Filed: Mar. 31, 2016

(86) PCT No.: PCT/NL2016/050222
§ 371 (c)(1),
(2) Date: Sep. 29, 2017

(87) PCT Pub. No.: WO2016/159768
PCT Pub. Date: Oct. 6, 2016

(65) Prior Publication Data
US 2018/0083409 A1     Mar. 22, 2018

(30) Foreign Application Priority Data
Apr. 1, 2015 (EP) .................... 15162251

(51) Int. Cl.
*H01S 3/08* (2006.01)
*H01S 3/10* (2006.01)
(Continued)

(52) U.S. Cl.
CPC .......... *H01S 3/0602* (2013.01); *H01S 3/0604* (2013.01); *H01S 3/0621* (2013.01);
(Continued)

(58) Field of Classification Search
CPC .... H01S 3/1024; H01S 3/0621; H01S 3/0405; H01S 2303/00
(Continued)

(56) References Cited

U.S. PATENT DOCUMENTS 5,333,077 A * 7/1994 Legar ................... G02B 5/1876
                                                            359/618
6,222,577 B1   4/2001 Sousa
(Continued)

OTHER PUBLICATIONS

Ronen, Eitian et al: "Phase locking a fiber laser array via diffractive coupling References and links", Jan. 13, 2011 (Jan. 13, 2011), pp. 474-476, XP055219375, Retrieved from the Internet: URL:/lwww.osapublishing.org/page 1511, last paragraph—p. 1512, paragraph 1; figure 1.
Sep. 14, 2016—International Search Report and Written Opinion of PCT/NL2016/050222.

*Primary Examiner* — Tuan Nguyen
(74) *Attorney, Agent, or Firm* — Banner & Witcoff, Ltd.

(57) ABSTRACT

A multi-beam laser cavity unit (10) comprises a laser crystal (13) and lens array (14) disposed in the laser cavity (LC). The lens array comprises an integral piece formed by a plurality of interconnected lenses. Each lens (14a) is configured to form a respective closed optical path (OPa) along the length (Z) of the laser cavity (LC) between the cavity mirrors (11,12) through the laser crystal (13) corresponding to a cavity mode for generating one (LBa) of the plurality of parallel laser beams (LB). The cavity unit (10) can be comprised in a laser system receiving pump light (PL) from a plurality of light sources. For example, the system can be used in a maskless patterning device.

19 Claims, 7 Drawing Sheets

(51) Int. Cl.
   *G02B 6/26*      (2006.01)
   *H01S 3/06*      (2006.01)
   *H01S 3/094*     (2006.01)
   *H01S 3/0941*    (2006.01)
   *H01S 3/102*     (2006.01)
   *H01S 3/23*      (2006.01)
   H01S 3/04        (2006.01)

(52) U.S. Cl.
   CPC .... *H01S 3/09415* (2013.01); *H01S 3/094053* (2013.01); *H01S 3/1024* (2013.01); *H01S 3/2383* (2013.01); *H01S 3/0405* (2013.01); *H01S 3/094076* (2013.01)

(58) Field of Classification Search
   USPC .................................................... 372/50.12
   See application file for complete search history.

(56)                References Cited

U.S. PATENT DOCUMENTS

| | | | |
|---|---|---|---|
| 6,385,229 B1 * | 5/2002 | Hiiro .................. | H01S 3/08004 |
| | | | 372/101 |
| 8,488,638 B2 | 7/2013 | Goldberg | |
| 2004/0091013 A1 * | 5/2004 | Yamaguchi ............ | G02B 27/09 |
| | | | 372/108 |
| 2007/0248136 A1 * | 10/2007 | Leonardo ............ | B23K 26/067 |
| | | | 372/55 |

* cited by examiner

MULTI-BEAM LASER SYSTEM

CROSS-REFERENCE TO RELATED APPLICATIONS

This application is a U.S. National Stage application under 35 U.S.C. § 371 of International Application PCT/NL2016/050222 (published as WO 2016/159768 A1), filed Mar. 31, 2016 which claims the benefit of priority to EP 15162251.1, filed Apr. 1, 2015. Benefit of the filing date of each of these prior applications is hereby claimed. Each of these prior applications is hereby incorporated by reference in its entirety.

TECHNICAL FIELD AND BACKGROUND

The present disclosure relates to a multi-beam laser cavity and a laser system comprising the cavity.

In the fields of maskless lithography and additive manufacturing it can be desired to provide an array of highly parallel laser sources, in which each channel can be controlled independently. The high degree of parallelism may provide a reduction of the beam size further down in the optical chain to meet the current state of the art values for common applications, e.g. writing conducting lines on flat panel displays with a few micrometers spot size.

For example, U.S. Pat. No. 8,488,638 describes a compact solid state laser that generates multiple wavelengths and multiple beams that are parallel, i.e., bore-sighted relative to each other. Each of the multiple laser beams can be at a different wavelength, pulse energy, pulse length, repetition rate and average power. Each of the laser beams can be turned on or off independently. The laser is comprised of an optically segmented gain section, common laser resonator with common surface segmented cavity mirrors, optically segmented pump laser, and different intra-cavity elements in each laser segment. Unfortunately, it can be difficult to generate and control multiple beams to have uniform beam properties.

For example, U.S. Pat. No. 6,222,577 describes direct patterning of a substrate by means of a solid state microchip laser, which is pumped by separate laser diodes and emits an array of laser spots. However, the laser system can be sensitive to small misalignment of the crystal facet. Furthermore, it can be difficult to control parameters like beam divergence and beam output size, e.g. because the size and divergence of the beams is strongly related to the heat deposited in the crystal, and therefore to the optical pump power.

U.S. Pat. No. 6,385,229 is directed to a laser having a resonator structure which efficiently generates only a fundamental transverse mode. The laser includes a laser source, first and second resonator mirrors, and an array illuminator optical system which is placed within the resonator optical system. The array illuminator optical system includes a Fourier plane array illuminator using one of a first lens array and a first phase grating; a Fourier transform lens; and a Fourier plane array illuminator using one of a second lens array and a second phase grating. The known laser system does not provide individual control of the laser beams.

There is a desire for a compact laser source array providing improved control and uniformity of the beam properties. There is a further desire for an array of highly parallel laser sources with individual control of the laser beams.

SUMMARY

A first aspect of the present disclosure provides a multi-beam laser cavity unit. The laser cavity unit comprises a front cavity mirror and a back cavity mirror forming a laser cavity there between. The front cavity mirror comprises a monolithic semi-transparent mirror surface configured as a single out-coupler for coupling a plurality of parallel laser beams out of the laser cavity. A laser crystal is disposed in the laser cavity and formed by a monolithic piece of gain medium configured to amplify laser light in the laser cavity by stimulated emission of radiation for generating the plurality of parallel laser beams. A lens array is disposed in the laser cavity and comprises an integral piece formed by a plurality of interconnected lenses extending side by side in a direction perpendicular to a length of the laser cavity. Each lens of the lens array is configured to form a respective closed optical path along the length of the laser cavity between the cavity mirrors through the laser crystal corresponding to a cavity mode for generating a respective one of the plurality of parallel laser beams.

By the use of monolithic or integral elements, i.e. elements formed of one piece, alignment and control of the laser beams can be simplified and the system will be more compact. Furthermore, a monolithic element may comprise unbroken optical surfaces. For example, the front mirror, back mirror, crystal, and lens array can each be positioned as one piece while simultaneously determining the properties of the plurality of laser beams. For example, the front mirror, back mirror, and crystal may comprise flat optical surfaces that are relatively easy to produce and to align. By using a lens array in the cavity, a plurality of cavity modes can be simultaneously defined and controlled in a uniform manner. For example, beam size and divergence of the plurality of laser beams can be controlled by positioning the lens array in the laser cavity, e.g. using a single translation stage.

By pumping the laser crystal through a dichroic end mirror of the laser cavity, multiple pump beams can arrive in parallel on the crystal, in particular parallel to the resulting cavity modes and output laser beams. By making a surface of the cavity mirror coincident with a surface of the laser crystal, the pump beams need only travel a short distance to the crystal. Accordingly, spot size of the pump beams on the crystal can be relatively small. By providing substantially flat reflective surfaces on the cavity mirrors, each of the parallel beams in the cavity may encounter the same angles of the reflection surface and the cavity modes can be more uniform. By using mirrors with a continuous optical surface there is no difficulty in aligning across discontinuities. Similarly, it is preferred that the crystal comprises a flat plate without discontinuities in its optical surfaces.

By using a relatively thin crystal plate e.g. compared to a length of the cavity, the effects of thermal lensing and cross-talk can be relatively small. To compensate for divergence e.g. caused by thermal lensing in the crystal, it is preferable to use an array of positive lenses. For example, the thermal lensing can be described as a second order effect. The array of lenses may help to achieve a stable mode in the cavity.

Lenses in the array can be a few millimeters in diameter. However, it is found that by using a micro-lens array in the cavity, the size of the resulting laser beams can be sufficiently small e.g. for lithographic purposes. Accordingly it is preferably to use a micro-lens array wherein each lens has a diameter of less than one millimeter, e.g. less than 500 micrometers, or even less than 300 micrometers, e.g. between 100 and 1000 micrometers to generate a respective laser beam of similar order size. For example, a micro-lens array can be formed by a fly-eye bonded lens array, i.e. an array of bonded drum lenses in fly-eye configuration. For example, the lenses can be connected by frit bonding. Alternatively, the micro-lens array can be made by using lithographic steps that define the place and shape of the individual lenses. For some applications, an important factor can be to have small gaps between the beams, relative to the beam diameter, i.e. a large fill factor. This can be achieved for example by selecting the location of the lens array.

A second aspect of the present disclosure provides a laser system comprising the multi-beam laser cavity unit as described herein. The laser system further comprises a pumping assembly. The pumping assembly comprises a plurality of light sources configured to generate pump light for pumping the laser crystal. A light guiding structure is configured to guide the pump light from a respective one of the light sources to a respective pump region in the laser crystal. Each pump region is disposed on a closed optical path in the laser cavity corresponding to a cavity mode of a respective one of the parallel laser beams.

For example, a light guiding structure comprising an optical system of lenses and mirrors can be used to guide the light to the crystal. Preferably, a light guiding structure comprising optical fibres is used for more easily guiding the light to separate spots on the crystal. By generating separate pump regions or light spots in the crystal, cross-talk between the lasing modes can be minimized. Thermal cross-talk can be managed e.g. by a thickness of the crystal and/or distance between pump spots. Preferably a distance between the spots is larger than their size. For example the spots are less than 500 micrometers, less than 300 micrometers or even less than 150 micrometers, e.g. between 100 and 250 micrometers. In another or further example, a distance between spots is more than 200 micrometers, more than 500 micrometers, more than 1 millimeter, more than 2 millimeters, or even more than 5 millimeters, e.g. between 0.5 and 3 millimeters. A size and/or intensity of the light spots of the pump light may be controlled e.g. by focusing means.

By individual controlling power to each of the light sources, e.g. semiconductor diodes, the plurality of parallel laser beams can be addressed independently. The control may e.g. be coordinated by a central controller in accordance with a pattern to be generated. By using multi-step power control when switching the light sources, oscillation of the cavity mode e.g. caused by relaxation oscillation may be suppressed. To suppress oscillation of the lasing mode when switching on a light source, it is found advantageous to ramp up power in two or more stages, e.g. wherein a first ramping rate (coefficient) is less steep than a subsequent ramping rate. On the other hand, when switching off the power, it is found advantageous to first ramp down with a relatively higher rate and subsequently with a relatively lower rate.

By providing a further optical system configured to focus the plurality of parallel laser beams onto a substrate surface, a pattern or signal can be relayed to the surface. For example, a maskless patterning device may use the laser system as described herein and an imaging system to image the laser beams on a substrate. For example a lithography device or additive manufacturing device may use the plurality of laser beams to write a pattern on a substrate or other surface. Accordingly, the laser system as described herein can be used for generating or varying an illumination pattern by selectively activating or deactivating a subset of the light sources and irradiating a surface with the illumination pattern of the resulting subset of laser beams.

BRIEF DESCRIPTION OF DRAWINGS

These and other features, aspects, and advantages of the apparatus, systems and methods of the present disclosure will become better understood from the following description, appended claims, and accompanying drawing wherein:

DESCRIPTION OF EMBODIMENTS

Figure 1A:
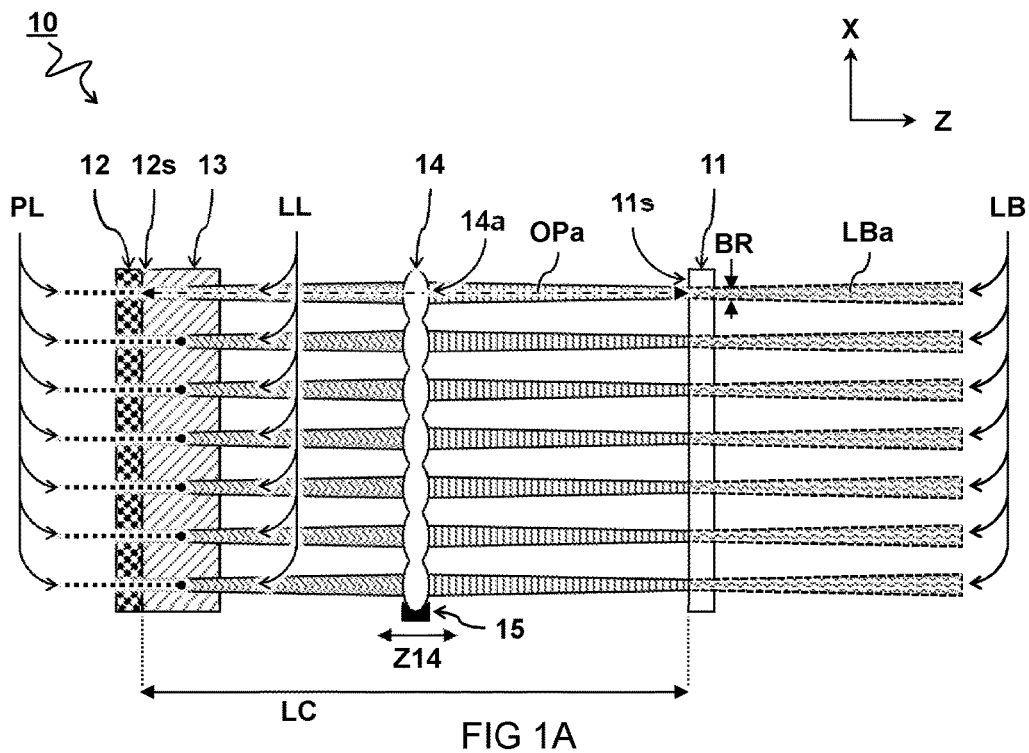
FIG. 1A shows a schematic side view of a first embodiment of a multi-beam laser cavity unit.

Unless otherwise defined, all terms (including technical and scientific terms) used herein have the same meaning as commonly understood by one of ordinary skill in the art to which this invention belongs as read in the context of the description and drawings. It will be further understood that terms, such as those defined in commonly used dictionaries, should be interpreted as having a meaning that is consistent with their meaning in the context of the relevant art and will not be interpreted in an idealized or overly formal sense unless expressly so defined herein. In some instances, detailed descriptions of well-known devices and methods may be omitted so as not to obscure the description of the present systems and methods. Terminology used for describing particular embodiments is not intended to be limiting of the invention. As used herein, the singular forms "a", "an" and "the" are intended to include the plural forms as well, unless the context clearly indicates otherwise. The term "and/or" includes any and all combinations of one or more of the associated listed items. It will be understood that the terms "comprises" and/or "comprising" specify the presence of stated features but do not preclude the presence or addition of one or more other features. It will be further understood that when a particular step of a method is referred to as subsequent to another step, it can directly follow said other step or one or more intermediate steps may be carried out before carrying out the particular step, unless specified otherwise. Likewise it will be understood that when a connection between structures or components is described, this connection may be established directly or through intermediate structures or components unless specified otherwise. All publications, patent applications, patents, and other references mentioned herein are incorporated by reference in their entirety. In case of conflict, the present specification, including definitions, will control.

According to some aspects, the present disclosure provides a compact laser source array that can be used for direct patterning of substrates by using suitable laser assisted processes (like laser assisted sintering). Advantageously, a single cavity can be used which is able to emit multiple laser beams that can be modulated (addressed) separately. Due to the construction principles, the multiple laser beams may be inherently parallel thus making subsequent alignment steps easier. The system can be scaled in the number of individual spots to be generated. It can allow the simple control of crucial output beam parameters like spot size and divergence for all beams at once, with benefit in the design of the demagnification system needed to focus tightly the beam on the substrate.

According to the present disclosure, an optical component composed by multiple lenses is inserted in the cavity to determine the multiple paths necessary to provide the separate laser channels. Such lens array component may give the possibility to tailor the size and divergence of the beam emitted by the laser. When the active medium within the above described cavity is illuminated by light from separate light sources, e.g. laser diodes, at a suitable wavelength, multiple localized excitation regions are created (inversion population regions); if these excited regions are aligned with the multiple lens element, laser radiation can be emitted in multiple spots from a single cavity. Such array of laser spots can then be focused on the substrate e.g. by means of a suitable de-magnifying system.

According to some embodiment, the system may comprise one or more or the following components. A pumping unit comprising multiple semiconductor diodes which emit laser light at a suitable wavelength compatible with the laser crystal. An array of electronic drivers used to independently control the emission of each diode. An optical system (i.e. light guide or independent light path) that routes and shapes the light emitted from each diode in order to obtain separate spots in a well-controlled geometrical distribution inside the laser crystal. A laser cavity unit comprising a front and back mirror, which form the optical cavity that provides the feedback mechanism necessary to obtain lasing; a laser crystal that serves as gain medium; a micro-lens array element that shapes the size of each laser spot, thus reducing cavity losses and enabling the control over divergence and spot size parameters.

The present systems and methods may benefit from the flexibility given by the presence of the lens array in the cavity. Thanks to this element, the output laser beams can be modified in size and divergence to match specific applications and experimental conditions. Moreover, the heat deposited on the crystal may not significantly influence the properties of the beams for a large range of pump power values, which gives the possibility of operating each laser to different output power levels without perturbing other parameters. The system may offer the benefit of flexibility in controlling the properties of the output beam array, by either shifting the lens array in the cavity or by properly select its parameters, thus offering additional flexibility in the design of the focusing system necessary to reduce the size of the laser spots on the substrate to be patterned. The introduction of the micro-lens array element determines a further degree of freedom that can be exploited to the benefit of the required application. Furthermore, the present system may feature the use of a fly-eye drum lens array in the cavity as a lenslet element. In contrast with standard micro-lens array element, such optical element may offer improved surface finishing, therefore minimizing the diffraction losses in the cavity and enabling efficient laser emission.

The systems and method can be applied e.g. to the direct patterning of substrate for maskless lithography applications, providing an array of highly parallel and identical laser sources. In this domain, the system offers distinct benefits since it enables the control over crucial parameters as beam divergence and beam size. Furthermore, it offers the possibility of direct modulation of each separate laser beam in the array. The inherent parallelism of each individual laser channel can find further application in different domains as for example in satellite laser communication, where it is not unusual to transmit different separate channels which needs to fulfil stringent requirements in terms of co-alignment.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. The description of the exemplary embodiments is intended to be read in connection with the accompanying drawings, which are to be considered part of the entire written description. In the drawings, the absolute and relative sizes of systems, components, layers, and regions may be exaggerated for clarity. Embodiments may be described with reference to schematic and/or cross-section illustrations of possibly idealized embodiments and intermediate structures of the invention. In the description and drawings, like numbers refer to like elements throughout. Relative terms as well as derivatives thereof should be construed to refer to the orientation as then described or as shown in the drawing under discussion. These relative terms are for convenience of description and do not require that the system be constructed or operated in a particular orientation unless stated otherwise.

FIG. 1A shows a schematic side view of a first embodiment of a multi-beam laser cavity unit 10.

The laser cavity unit 10 comprises a front cavity mirror 11 and a back cavity mirror 12 forming a laser cavity LC there between. In one embodiment, the front cavity mirror 11 comprises a monolithic semi-transparent mirror surface 11s configured as a single out-coupler for coupling a plurality of parallel laser beams LB out of the laser cavity LC. As used herein, a monolithic element refers to an element consisting of one solid piece as opposed e.g. to separate pieces held together. A monolithic optical element may comprise an unbroken continuous optical surface.

The laser cavity unit 10 comprises a laser crystal 13 disposed in the laser cavity LC and formed by a monolithic piece of gain medium configured to amplify laser light LL for the plurality of parallel laser beams LB in the laser cavity LC. In one embodiment, the laser crystal 13 comprises a flat plate having a thickness along the length Z of the laser cavity LC that is less than its width and height along the dimensions X,Y perpendicular to the thickness. In one embodiment, the optical faces of the laser crystal 13 are flat, i.e. without irregularities. This allows more flexibility in the positioning of the pumping light beams PL anywhere on the crystal surface, e.g. to match positions of the respective lenses in the lens array 14.

The laser cavity unit 10 comprises a lens array 14 disposed in the laser cavity LC. In the embodiment, the lens array 14 comprises an integral piece formed by a plurality of interconnected lenses extending side by side in a direction X and/or Y substantially perpendicular to a length Z of the laser cavity LC. An integral piece may refer to a piece consisting of elements integrated together, e.g. glued or bonded. Each lens 14a of the lens array 14 is configured to form a respective closed optical path OPa along the length Z of the laser cavity LC between the cavity mirrors 11,12 through the laser crystal 13. The optical path OPa corresponds to a cavity mode for generating one LBa of the plurality of parallel laser beams LB. For example, lenses can be coated so that losses at the wavelength of the laser emission are minimized (anti reflective coating).

In one embodiment, the back cavity mirror 12 comprises a dichroic mirror surface 12s configured to reflect laser light LL in the laser cavity LC and transmit pump light PL for pumping the laser crystal 13 through the back cavity mirror 12 and creating a population inversion in the laser crystal 13 to amplify the laser light LL in the laser cavity LC by stimulated emission of radiation. In one embodiment, a surface 12s of the back cavity mirror 12 is coincident with a surface of the laser crystal 13. In one embodiment, the front cavity mirror 11 and the back cavity mirror 12 comprise flat reflective surfaces 11s, 12s forming the laser cavity LC.

Figure 1B:
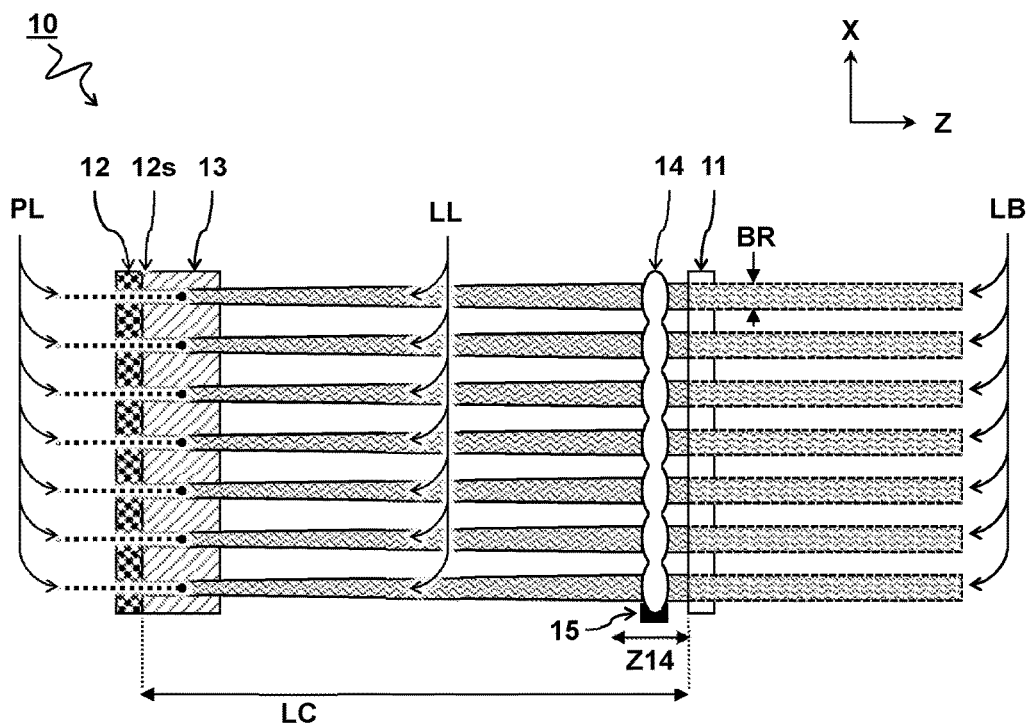
FIG. 1B shows the first embodiment of the multi-beam laser cavity unit wherein the lens array is moved.

FIG. 1B shows the embodiment of FIG. 1A, wherein the lens array 14 is moved from a middle position towards the front cavity mirror 11. In one embodiment, the laser cavity unit 10 comprises a lens stage configured to position the lens array 14 in the laser cavity LC. In one embodiment, the laser cavity unit 10 comprises a translation stage 15 configured to position the lens array 14 as a whole along the length Z of the laser cavity LC for simultaneously determining respective beam characteristics of the plurality of parallel laser beams LB. For example, the lens array 14 may simultaneously determine the beam waist and thus beam divergence of the plurality of parallel laser beams. For example, the translation stage 15 can be motorized. In one embodiment, the translation stage 15 is under control of a processor to simultaneously determine a beam size and/or divergence the plurality of parallel laser beams LB. For example, moving the lens array 14 towards the front cavity mirror 11 may increase beam size BR at the exit of the front cavity mirror 11. The plurality of parallel laser beams LB may also be collimated by the positioning of the lens array 14. Typically, for each position of the lens array, there will be a flat wavefront at surface 11s wherein the beam (waist) diameter can be controlled.

Figure 2A:
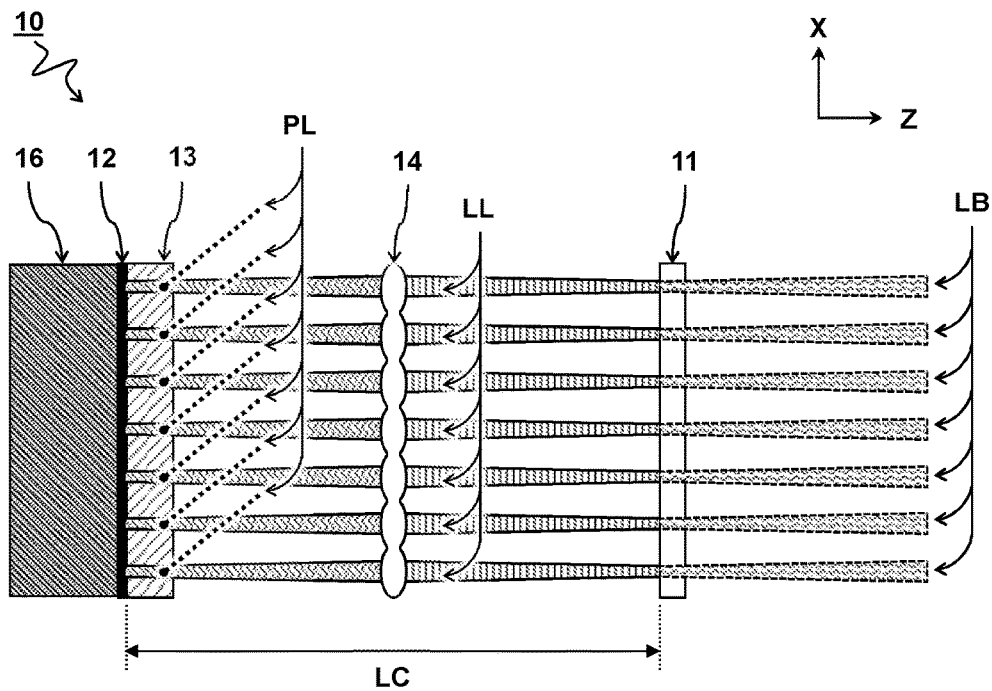
FIG. 2A shows a schematic side view of a second embodiment of a multi-beam laser cavity unit comprising a heat sink.

FIG. 2A shows a schematic side view of a second embodiment of a multi-beam laser cavity unit comprising a heat sink 16. In one embodiment, the unit 10 comprises a heat sink 16, e.g. a metal block or other material with relatively high heat capacity and conduction. In one embodiment, the heat sink 16 is attached directly to the back cavity mirror 12. In a further embodiment, the surface of the back cavity mirror 12 is coincident with the surface of the laser crystal 13. In other words, the back cavity mirror 12 is disposed between the laser crystal 13 and the heat sink 16. In one embodiment, the back cavity mirror 12 acts as a heat sink alone or in combination with an additional heat sink 16. In one embodiment, the back cavity mirror 12 is formed by a surface of the heat sink 16 attached to the laser crystal 13. By drawing heat away from the laser crystal 13, thermal effects of the pump light PL on the laser crystal 13 can be alleviated.

In one embodiment, the pump light PL is directed towards the laser crystal 13 from a side of the laser cavity LC, e.g. at an angle as shown. In one embodiment (not shown), a dichroic mirror is placed in the laser cavity configured to couple the pump light PL from within the cavity LC towards the laser crystal 13 while letting the laser light LL pass there through. Advantageously, the dichroic intracavity mirror may allow to direct the pump light PL entering the crystal at an angle that is normal to the crystal surface. The pump regions may thus extend into the crystal in a path of the cavity mode thus achieving improved efficiency. It will be appreciated that by pumping the laser crystal 13 from the sided of the laser cavity LC, the heat sink 16 need not be transparent, e.g. a metal block. A combination of a heat sink 16 and intracavity mirror may allow both efficient pumping and heat dissipation.

Figure 2B:
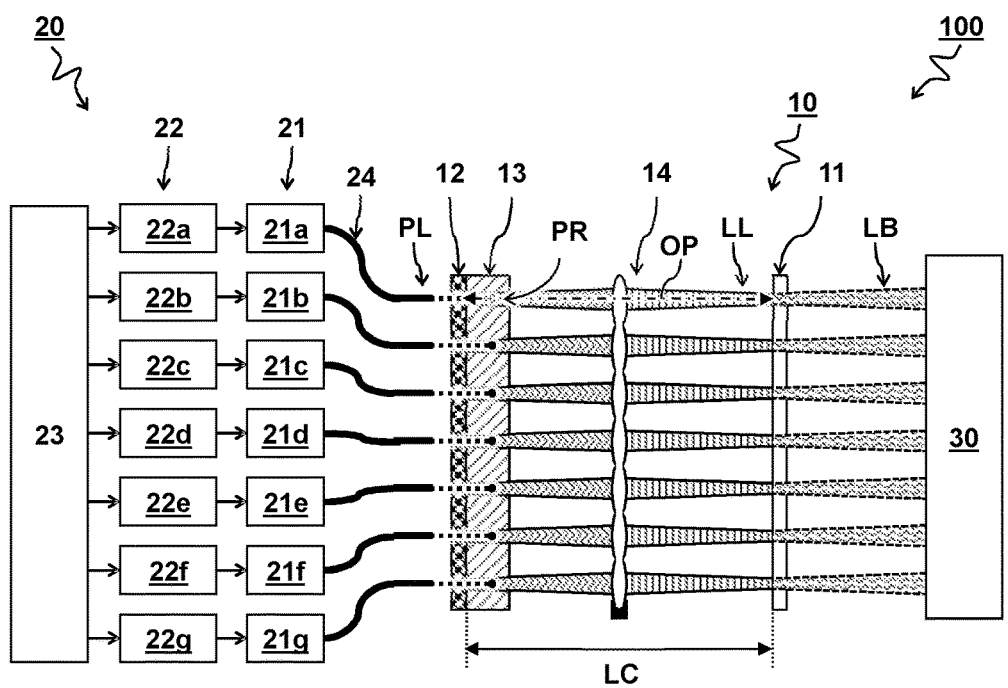
FIG. 2B shows a schematic side view of an embodiment of a laser system comprising a laser cavity unit and a pumping assembly.

FIG. 2B shows a schematic side view of an embodiment of a laser system 100 comprising a multi-beam laser cavity unit 10, e.g. as described herein, and a pumping assembly 20.

In one embodiment, the pumping assembly 20 comprises a plurality of light sources 21 configured to generate pump light PL for pumping the laser crystal 13. By using separate light sources, power to the pump regions of the individual laser beams can be effectively controlled. In one embodiment, the pumping assembly 20 comprises a controller 23 and electronic drivers 22 configured to independently control power to each of the light sources 21 for individually switching each of the plurality of parallel laser beams LB. In one embodiment, the pumping assembly 20 comprises a central controller 23 configured to coordinate control of the plurality of electronic drivers 22. In one embodiment, the light sources 21 comprise a plurality of semiconductor diodes.

In one embodiment, the pumping assembly 20 comprises or couples to a light guiding structure 24 configured to guide the pump light PL from a respective one of the light sources 21 to a respective pump region PR in the laser crystal 13. In one embodiment each pump region PR is disposed on a closed optical path in the laser cavity LC corresponding to a cavity mode of a respective one of the parallel laser beams LB. In one embodiment, the light guiding structure 24 comprises or couples to a focusing means (not shown) configured to focus light from the light sources 21 onto the respective pump regions PR in the laser crystal 13 In one embodiment, the light guiding structure 24 comprises optical fibres for guiding light from the light sources 21 to the laser crystal 13.

In one embodiment, the laser system 100 comprises an optical system 30 configured to focus the plurality of parallel laser beams LB onto a substrate surface. In one embodiment, the optical system 30 comprises an imaging system for imaging the plurality of parallel laser beams LB onto an imaging surface. In one embodiment, the optical system 30 comprises a focussing or de-magnifying means.

In one embodiment, the laser system 100 comprises a substrate holder for holding a substrate to be patterned (not shown). In one embodiment, the imaging system 30 is configured to image the plurality of parallel laser beams LB emitted from the laser system 100 as a patterned light distribution onto a surface of the substrate by selective activation of a subset of the plurality of parallel laser beams LB. Accordingly, the laser system 100 may form part of a maskless patterning device comprising the laser system 100 as described herein. In one embodiment, the patterning device is a lithography device. In another embodiment, the patterning device is an additive manufacturing device. In one embodiment, the laser beams LB are used for writing a pattern on the substrate. In one embodiment, the substrate comprises a radiation sensitive layer. In one embodiment, the substrate comprises a radiation hardening material, e.g. resin.

It will be appreciated that the laser system 100 can be used for a method for generating or varying an illumination pattern. In one embodiment, the method comprises selectively activating or deactivating a subset of the light sources 21 and irradiating a surface with the illumination pattern of the resulting subset of laser beams LB. For example a plurality but not all of the light sources 21 may be active simultaneously and switched to another subset of the light sources 21.

Figure 3A:
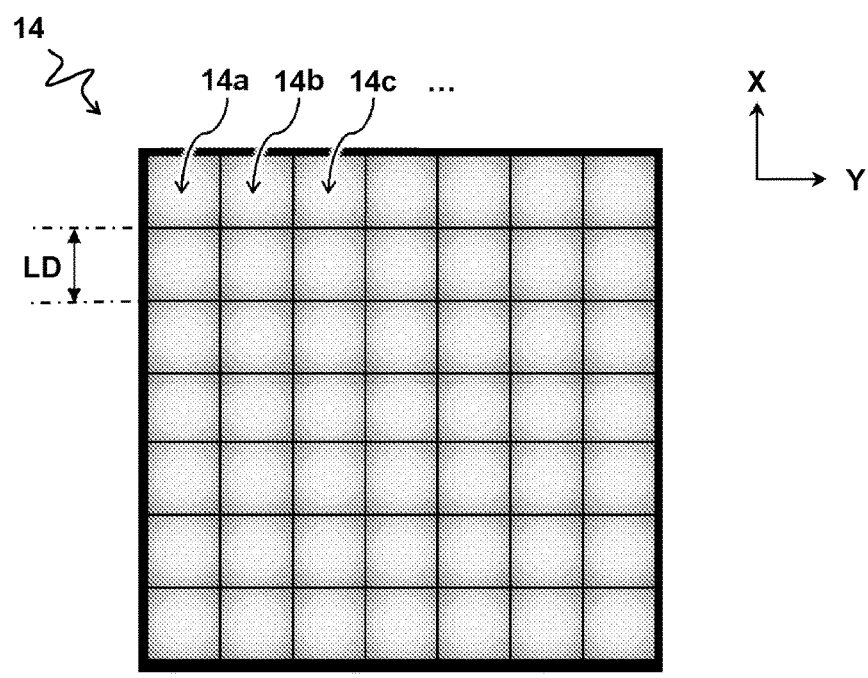
FIG. 3A shows a schematic front view of a first embodiment of a lens array.

FIG. 3A shows a schematic front view of a first embodiment of a lens array 14. In one embodiment, the lens array 14 forms a grid of lenses 14a, 14b, 14c, bonded together to form the array. In one embodiment, the lens array 14 comprises a micro-lens array. In one embodiment, each lens of the lens array 14 has a cross-section size or lens diameter LD or of less than one millimeter, less than 500 micrometers, or less than 300 micrometers. In one embodiment, the lens array 14 comprises a fly-eye bonded lens array. In one embodiment, the lens array 14 comprises array of bonded drum lenses in fly-eye configuration. In one embodiment, the individual lenses 14a, 14b, 14c are produced separately, e.g. by cutting from a curved surface and glued or otherwise bonded together. In one embodiment, lenses of the array 14 are interconnected by frit bonding. In one embodiment, the lenses 14a,14b,14c of lens array 14 are positive lenses. A positive or converging lens is typically a lens that is thickest at its centre and thinner toward its outer portions thus causing light which passes through it to converge.

Figure 3B:
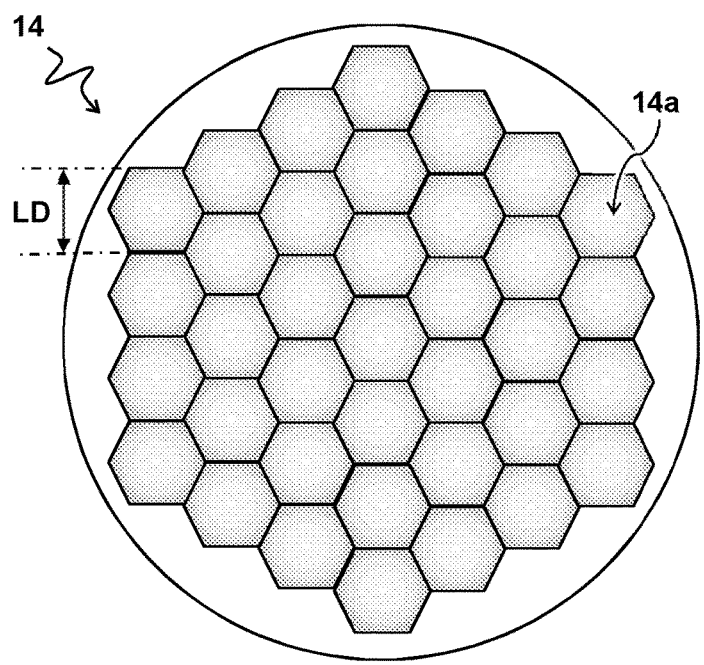
FIG. 3B shows a schematic front view of a second embodiment of a lens array.

FIG. 3B shows a schematic front view of a second embodiment of a lens array 14. In one embodiment, the lenses 14a of the array 14 are shaped as polygons e.g. squares or hexagons, configured to fit together in tight packing. In one embodiment, the lenses extend across two dimensions X and Y to form a grid of lenses. In principle the lenses may be arranged together in any configuration, moveable as a single unit. For the present purposes of the multi-beam laser cavity unit 10 it is preferable that the lens array 14 comprises at least five lenses, preferably more, e.g. more than ten, more than twenty, more than thirty, more than fifty, or even more than a hundred lenses.

Figure 4A:
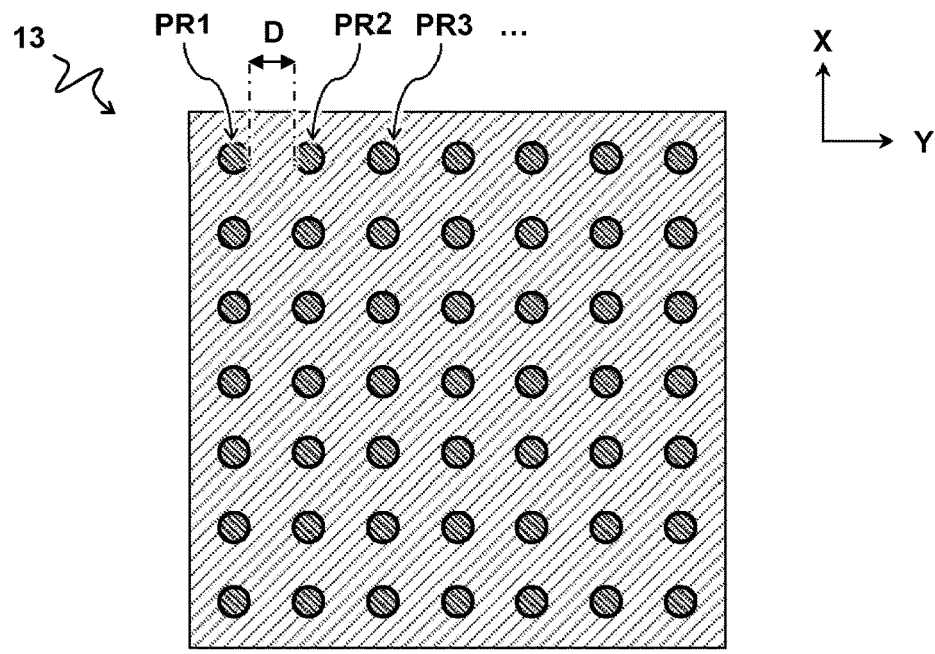
FIG. 4A shows a schematic front view of a laser crystal with a distribution of pump spots.

FIG. 4A shows a schematic front view of a laser crystal 13 with a distribution of pump spots or regions PR1, PR2, PR3. In one embodiment, the light sources and light guiding structure are configured to generate a plurality pumping light beams PL forming respective pump regions PR1,PR2 in the laser crystal 13. In one embodiment, the pump regions PR1,PR2 are spatially separated from each other, e.g. by distance D. In one embodiment, the pumping light beams PL form spatially separate spots on an input face of the laser crystal 13, i.e. where the pumping light enters the crystal. In one embodiment, the spots have a diameter or full width half maximum (e.g. measured at the input face of the laser crystal) of less than 500 micrometers, less than 300 micrometers or even less than 150 micrometers, e.g. between 100 and 250 micrometers.

Figure 4B:
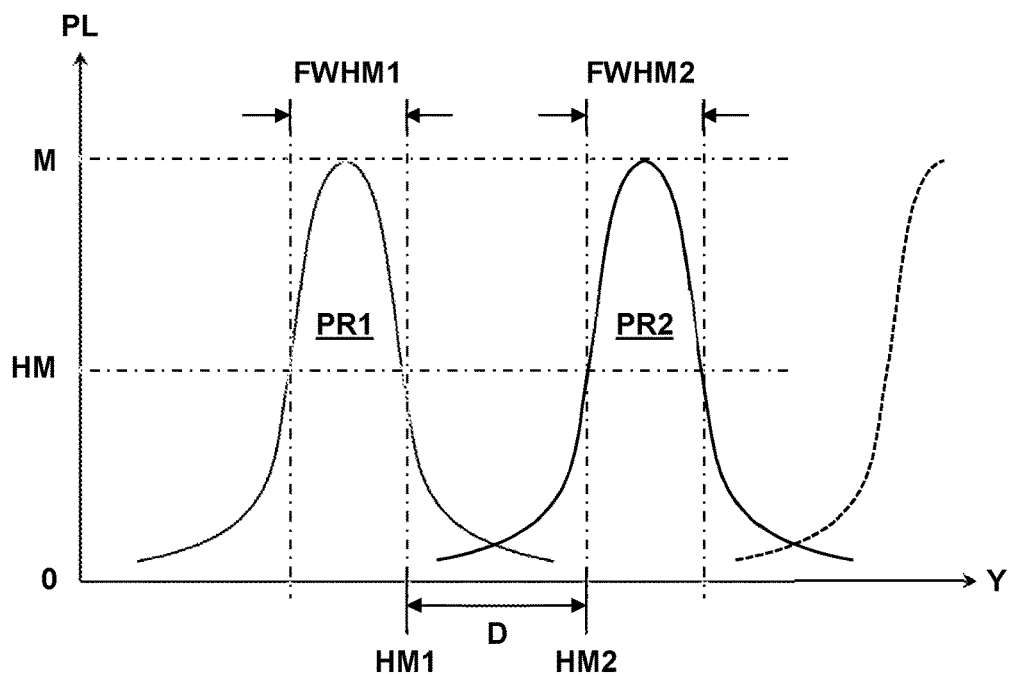
FIG. 4B shows a schematic graph of pump intensities across a coordinate of the crystal surface.

FIG. 4B shows a schematic graph of pump intensities across a coordinate Y of the crystal surface, e.g. as shown in FIG. 4A. In one embodiment, a distance D between a half maximum boundary HM1 of a first pump region PR1 and a half maximum boundary HM2 of a second pump region PR2, immediately neighbouring the first pump region PR1, is higher than a full width half maximum FWHM1,FWHM2 of the first or second pump regions PR1,PR2, e.g. measured at the input face of the laser crystal 13. In one embodiment, the distance D is more than 100 micrometers, more than 200 micrometers, more than 500 micrometers, more than 1 millimeter, more than 2 millimeters, more than 5 millimeters, e.g. between 0.5 and 3 millimeters. Higher distances of separation D may further prevent or alleviate (thermal) crosstalk or interference between neighbouring beams.

Figure 5A:
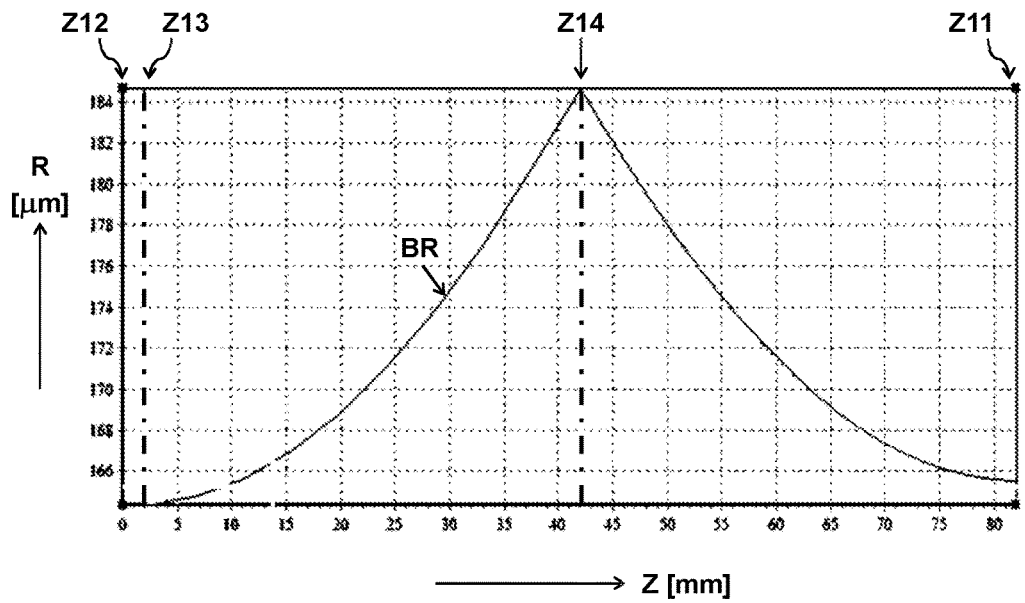
FIGS. 5A and 5B shows a calculated graphs of beam waist in a laser cavity as a function of lens position.
Figure 5B:
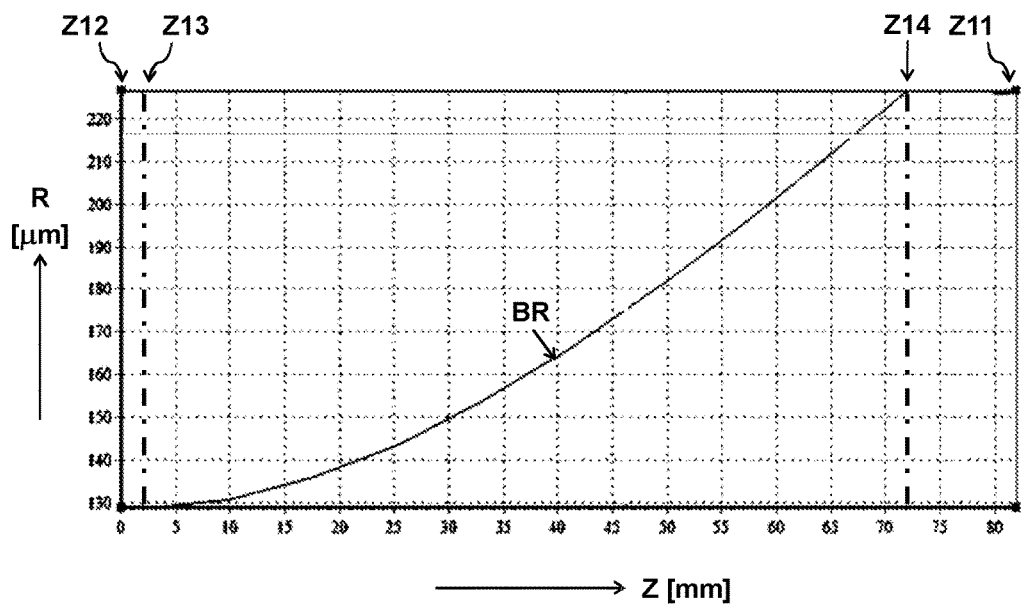

FIGS. 5A and 5B show calculated graphs of beam waist BR in a laser cavity as a function of position between the position Z11 of the front mirror and the positions Z12 and Z13 of the back mirror and laser crystal, respectively. FIG. 5A shows a graph wherein the position Z14 of the lens or lens array is approximately half way between the cavity mirrors. This figure may e.g. correspond to the positioning of the lens array as shown in FIG. 1A. FIG. 5B shows a graph wherein the position Z14 of the lens or lens array is almost at the position Z11 of the front cavity mirror and may e.g. correspond to the positioning of the lens array as shown in FIG. 1B.

Figure 6A:
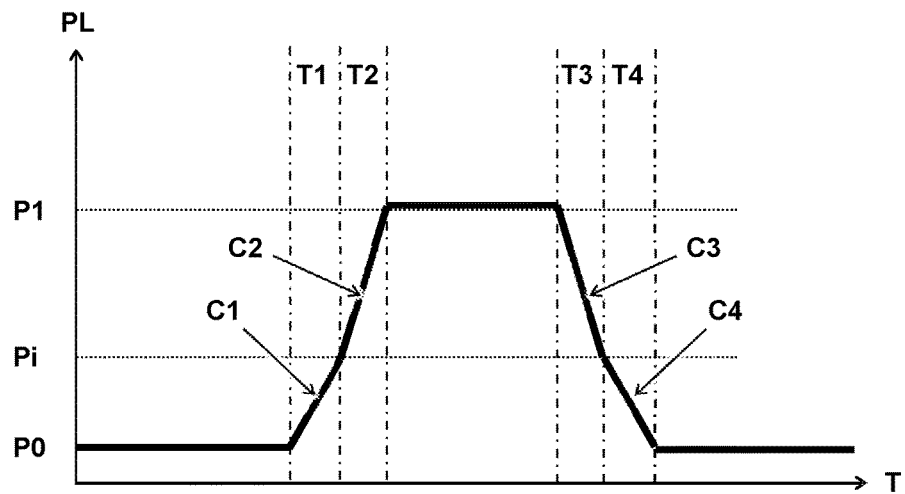
FIG. 6A shows a schematic graph of ramping pump power as a function of time.

FIG. 6A shows a schematic graph of ramping pump power P as a function of time. In one embodiment, the light sources for pumping the laser crystal are switched on or off using a multi-step power control for suppressing relaxation oscillation of the cavity mode after switching. In one embodiment, switching of a light source 21a comprises switching from an initial power level P0 to an intermediate power level Pi in a first time interval T1 before switching from the intermediate power level Pi to a final power level P1 in a second time interval T2, wherein power of the pump light PL is ramped up with a first ramping coefficient C1 in the first time interval T1 and ramped up with a second ramping coefficient C2 in the second time interval T2, wherein the first ramping coefficient C1 is different than the second ramping coefficient C2. In one embodiment, when the light source 21a is switched on from a low power level P0 to a high power level P1, the ramping coefficient C1 between the low power level P0 and the intermediate power level Pi is lower than the ramping coefficient C2 between the intermediate power level Pi and the high power level P1. In one embodiment, when the light source 21a is switched off from a high power level P1 to a low power level P0, the ramping coefficient C3 between the high power level P1 and the intermediate power level Pi is higher than the ramping coefficient C4 between the intermediate power level Pi and the initial power level P0.

Figure 6B:
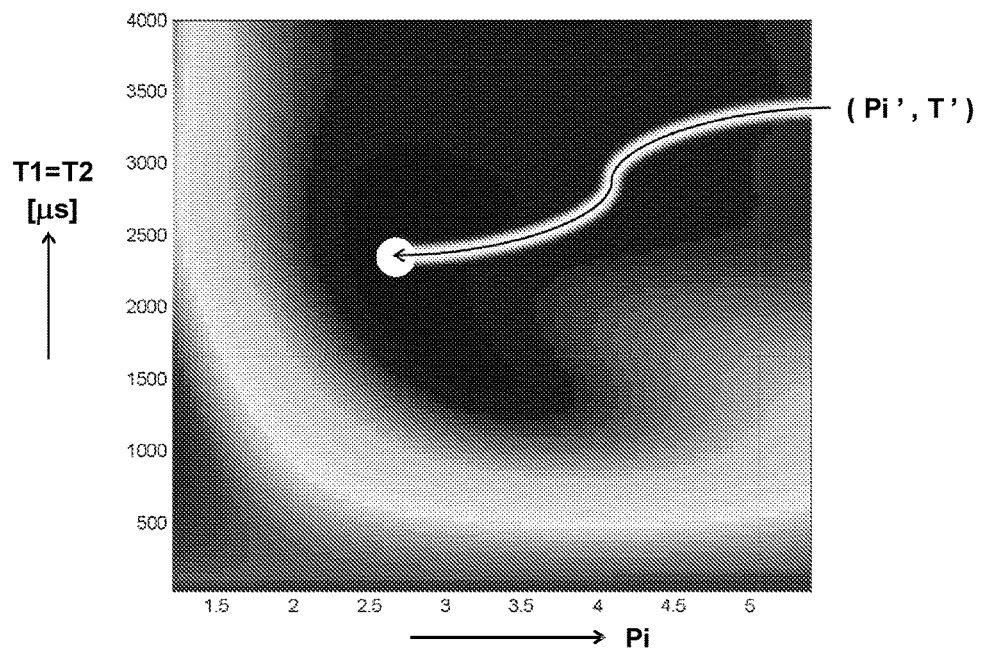
FIG. 6B shows a calculated graph of laser oscillation amplitude as a function of ramping time and position of an intermediate power level.

FIG. 6B shows a calculated color map of laser relaxation oscillation amplitude as a function of ramping time T1 (in this case equal to T2) and position of the intermediate power level Pi, as shown in FIG. 6A. The region indicated by reference (Pi', T') corresponds to a minimum amplitude of the relaxation oscillation and can thus be used for optimal switching of the light sources. Of course the figure is only illustrative of one possible calculation which may depend on modulation profile and characteristics of the laser, e.g. mirror reflectivities, gain medium, distance between mirrors, position and strength of the lens.

Figure 7A:
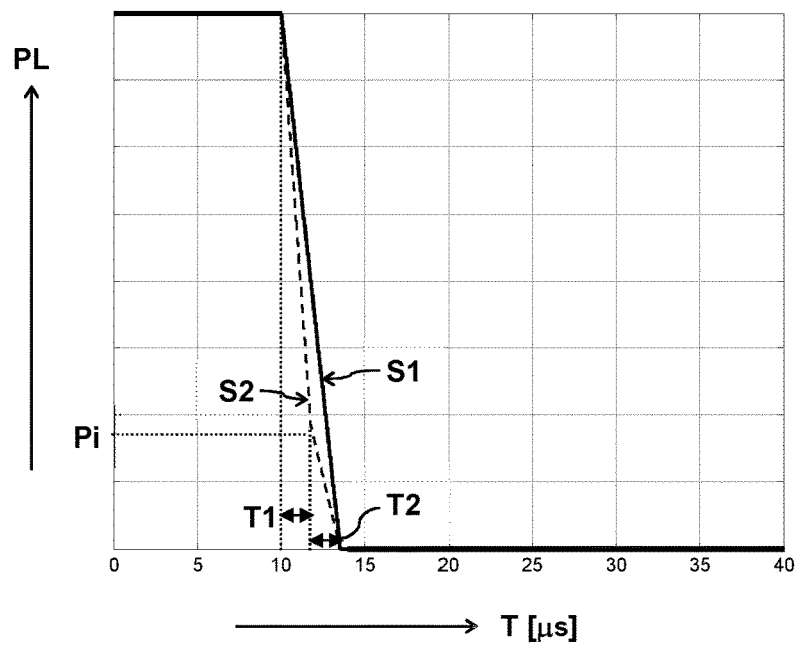
FIG. 7A shows two different graphs of pump power variation as a function of time.
Figure 7B:
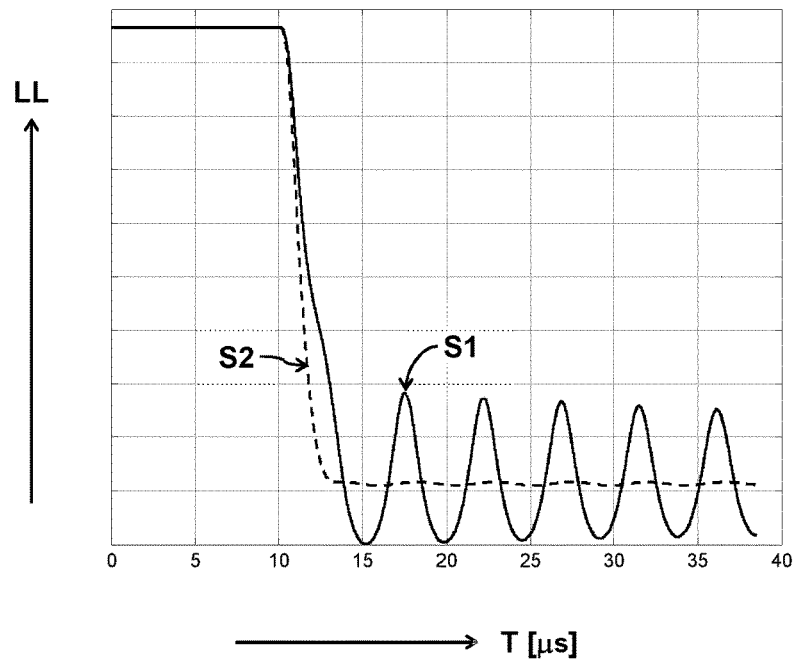
FIG. 7B shows resulting oscillation of the laser light as a function of time.

FIG. 7A shows two different graphs of pump power variation PL as a function of time T. The solid line S1 corresponds to a single linear ramp of the pump power PL. The dashed line S2 corresponds to a two step ramp of the pump power PL, e.g. with ramping coefficients optimized for minimal relaxation oscillation. FIG. 7B shows resulting oscillation of the laser light LL as a function of time for the respective pump power variation S1 and S2.

For the purpose of clarity and a concise description, features are described herein as part of the same or separate embodiments, however, it will be appreciated that the scope of the invention may include embodiments having combinations of all or some of the features described. It is appreciated that this disclosure offers particular advantages to maskless patterning, and in general can be applied for any application wherein it is beneficial to generate multiple laser sources parallel to each other, controllable in size and divergence and separately addressable. For example different technological areas ranging from direct patterning to laser communication. For example, semiconductor industries specifically working in flat panel displays/solar cells patterning. For example, space industries working in laser communication and ranging programs;

While the present systems and methods have been described in particular detail with reference to specific exemplary embodiments thereof, it should also be appreciated that numerous modifications and alternative embodiments may be devised by those having ordinary skill in the art without departing from the scope of the present disclosure. For example, embodiments wherein devices or systems are disclosed to be arranged and/or constructed for performing a specified method or function inherently disclose the method or function as such and/or in combination with other disclosed embodiments of methods or systems. Furthermore, embodiments of methods are considered to inherently disclose their implementation in respective hardware, where possible, in combination with other disclosed embodiments of methods or systems. Furthermore, methods that can be embodied as program instructions, e.g. on a non-transient computer-readable storage medium, are considered inherently disclosed as such embodiment.

Finally, the above-discussion is intended to be merely illustrative of the present systems and/or methods and should not be construed as limiting the appended claims to any particular embodiment or group of embodiments. The specification and drawings are accordingly to be regarded in an illustrative manner and are not intended to limit the scope of the appended claims. In interpreting the appended claims, it should be understood that the word "comprising" does not exclude the presence of other elements or acts than those listed in a given claim; the word "a" or "an" preceding an element does not exclude the presence of a plurality of such elements; any reference signs in the claims do not limit their scope; several "means" may be represented by the same or different item(s) or implemented structure or function; any of the disclosed devices or portions thereof may be combined together or separated into further portions unless specifically stated otherwise. The mere fact that certain measures are recited in mutually different claims does not indicate that a combination of these measures cannot be used to advantage. In particular, all working combinations of the claims are considered inherently disclosed.

The invention claimed is:

1. A multi beam laser system comprising
a front cavity mirror and a back cavity mirror forming a laser cavity there between, wherein the front cavity minor comprises a monolithic semi-transparent minor surface configured as a single out-coupler for coupling a plurality of parallel laser beams out of the laser cavity, and wherein the back cavity mirror comprises a monolithic dichroic mirror surface configured to reflect laser light in the laser cavity and transmit pump light for pumping the laser crystal through the back cavity mirror;
a laser crystal disposed in the laser cavity and formed by a monolithic piece of gain medium configured to amplify laser light for the plurality of parallel laser beams in the laser cavity;
a lens array disposed in the laser cavity and comprising an integral piece formed by a plurality of interconnected lenses extending side by side in a direction perpendicular to a length of the laser cavity, wherein each lens of the lens array is configured to form a respective closed optical path along the length of the laser cavity between the cavity mirrors through the laser crystal corresponding to a cavity mode for generating one of the plurality of parallel laser beams;
a plurality of light sources configured to generate the pump light for pumping the laser crystal;
a light guiding structure configured to guide the pump light from a respective one of the light sources to a respective pump region in the laser crystal, wherein each pump region is disposed on a closed optical path in the laser cavity corresponding to a cavity mode of a respective one of the parallel laser beams; and
controller and electronic drivers configured to independently vary the power to each of the light sources for individually controlling each of the plurality of parallel laser beams.

2. The laser system according to claim 1, comprising a translation stage configured to position the lens array as a whole along the length of the laser cavity for simultaneously determining respective beam characteristics of the plurality of parallel laser beams.

3. The laser system according to claim 1, wherein a surface of the back cavity mirror is coincident with a surface of the laser crystal.

4. The laser system according to claim 1, wherein the front cavity mirror and the back cavity mirror comprise flat reflective surfaces forming the laser cavity.

5. The laser system according to claim 1, comprising a heat sink configured to draw heat from the laser crystal.

6. The laser system according to claim 1, wherein the laser crystal comprises a flat plate having a thickness along the length of the laser cavity that is less than its width and height along the dimensions perpendicular to the thickness.

7. The laser system according to claim 1, wherein the light sources and light guiding structure are configured to generate a plurality pumping light beams forming respective pump regions in the laser crystal, wherein the pump regions are spatially separated from each other.

8. The laser system according to claim 1, wherein the light guiding structure comprises optical fibers for guiding light from the light sources to the laser crystal.

9. The laser system according to claim 1, wherein the light sources are switched from a high to low state using a multi-step power control for suppressing relaxation oscillation of the cavity mode after switching.

10. The laser system according to claim 1 wherein switching of a light source comprises switching from an initial power level to an intermediate power level in a first time interval before switching from the intermediate power level to a final power level in a second time interval, wherein power of the pump light is ramped up with a first ramping coefficient in the first time interval and ramped up with a second ramping coefficient in the second time interval, wherein the first ramping coefficient is different than the second ramping coefficient.

11. The laser system according to claim 10, wherein
when the light source is switched on from a low power level to a high power level, the ramping coefficient between the low power level and the intermediate power level is lower than the ramping coefficient between the intermediate power level and the high power level; and when the light source is switched off from a high power level to a low power level, the ramping coefficient between the high power level and the intermediate power level is higher than the ramping coefficient between the intermediate power level and the initial power level.

12. The laser system according to claim 1, comprising a substrate holder for holding a substrate, wherein the laser system forms a maskless patterning device configured to selectively control imaging each of the plurality of parallel laser beams onto a surface of the substrate by the individual control of each of the plurality of parallel laser beams.

13. A multi beam laser system comprising
a front cavity mirror and a back cavity mirror forming a laser cavity there between, wherein the front cavity minor comprises a monolithic semi-transparent minor surface configured as a single out-coupler for coupling a plurality of parallel laser beams out of the laser cavity;
a laser crystal disposed in the laser cavity and formed by a monolithic piece of gain medium configured to amplify laser light for the plurality of parallel laser beams in the laser cavity;
a lens array disposed in the laser cavity and comprising an integral piece formed by a plurality of interconnected lenses extending side by side in a direction perpendicular to a length of the laser cavity, wherein each lens of the lens array is configured to form a respective closed optical path along the length of the laser cavity between the cavity mirrors through the laser crystal corresponding to a cavity mode for generating one of the plurality of parallel laser beams;
a plurality of light sources configured to generate pump light for pumping the laser crystal;
a light guiding structure configured to guide the pump light from a respective one of the light sources at an angle with respect to the length of the laser cavity, onto a front face of the laser crystal, said front face facing into the laser cavity, and to a respective pump region in the laser crystal, wherein each pump region is disposed on a closed optical path in the laser cavity corresponding to a cavity mode of a respective one of the parallel laser beams;
a heat sink directly connected to the back cavity minor, wherein the back cavity mirror is disposed between the laser crystal and the heat sink, wherein a surface of the back cavity mirror is coincident with a surface of the laser crystal, wherein the heat sink is configured to draw heat from the laser crystal via the back cavity mirror; and
a controller and electronic drivers configured to independently vary the power to each of the light sources for individually controlling each of the plurality of parallel laser beams.

14. The laser system according to claim 13, wherein the light sources are switched from a high to low state using a multi-step power control for suppressing relaxation oscillation of the cavity mode after switching.

15. The laser system according to claim 13, wherein switching of a light source comprises switching from an initial power level to an intermediate power level in a first time interval before switching from the intermediate power level to a final power level in a second time interval, wherein power of the pump light is ramped up with a first ramping coefficient in the first time interval and ramped up with a second ramping coefficient in the second time interval, wherein the first ramping coefficient is different than the second ramping coefficient.

16. The laser system according to claim 13, wherein
when the light source is switched on from a low power level to a high power level, the ramping coefficient between the low power level and the intermediate power level is lower than the ramping coefficient between the intermediate power level and the high power level; and
when the light source is switched off from a high power level to a low power level, the ramping coefficient between the high power level and the intermediate power level is higher than the ramping coefficient between the intermediate power level and the initial power level.

17. The laser system according to claim 13, comprising a substrate holder for holding a substrate, wherein the laser system forms a maskless patterning device configured to selectively control imaging each of the plurality of parallel laser beams onto a surface of the substrate by the individual control of each of the plurality of parallel laser beams.

18. A multi beam laser system comprising
a front cavity mirror and a back cavity mirror forming a laser cavity there between, wherein the front cavity minor comprises a monolithic semi-transparent minor surface configured as a single out-coupler for coupling a plurality of parallel laser beams out of the laser cavity;
a laser crystal disposed in the laser cavity and formed by a monolithic piece of gain medium configured to amplify laser light for the plurality of parallel laser beams in the laser cavity;
a lens array disposed in the laser cavity and comprising an integral piece formed by a plurality of interconnected lenses extending side by side in a direction perpendicular to a length of the laser cavity, wherein each lens of the lens array is configured to form a respective closed optical path along the length of the laser cavity between the cavity mirrors through the laser crystal corresponding to a cavity mode for generating one of the plurality of parallel laser beams;
a plurality of light sources configured to generate pump light for pumping the laser crystal;
a light guiding structure configured to guide the pump light from a respective one of the light sources to a respective pump region in the laser crystal, wherein each pump region is disposed on a closed optical path in the laser cavity corresponding to a cavity mode of a respective one of the parallel laser beams; and
a controller and electronic drivers configured to independently vary the power to each of the light sources for individually controlling each of the plurality of parallel laser beams, wherein the controller is configured to switch the light sources from a high to low state using a multi-step power control for suppressing relaxation oscillation of the cavity mode after switching. wherein the switching of a light source comprises switching from an initial power level to an intermediate power level in a first time interval before switching from the intermediate power level to a final power level in a second time interval, wherein power of the pump light is ramped up with a first ramping coefficient in the first time interval and ramped up with a second ramping coefficient in the second time interval, wherein the first ramping coefficient is different than the second ramping coefficient, wherein when the light source is switched on from a low power level to a high power level, the ramping coefficient between the low power level and the intermediate power level is lower than the ramping coefficient between the intermediate power level and the high power level; and when the light source is switched off from a high power level to a low power level, the ramping coefficient between the high power level and the intermediate power level is higher than the ramping coefficient between the intermediate power level and the initial power level.

19. The laser system according to claim 18, comprising a substrate holder for holding a substrate, wherein the laser system forms a maskless patterning device configured to selectively control imaging each of the plurality of parallel laser beams onto a surface of the substrate by the individual control of each of the plurality of parallel laser beams.

* * * * *